3,020,289
POLYMERIZATION OF 2-p-DIOXANONE WITH SULFURIC ACID
Eugene A. Weipert, Detroit, Mich., assignor to Wyandotte Chemicals Corporation, Wyandotte, Mich., a corporation of Michigan
No Drawing. Filed Mar. 4, 1960, Ser. No. 12,660
4 Claims. (Cl. 260—340.2)

This invention relates to a process for the controlled polymerization of 2-p-dioxanone. In one of its aspects, this invention relates to a polymerized 2-p-dioxanone product having a hard, shiny appearance and a melting point in excess of 90° C. made in accordance with the process of this invention.

2-p-dioxanone is a known chemical made by the catalytic dehydrogenation of diethylene glycol, generally over a copper-chromium catalyst as disclosed in U.S. Patents 2,142,033 and 2,807,629. It is useful as a plasticizer for acrylonitrile polymers as disclosed in U.S. Patents 2,631,-989, and also as an intermediate in the preparation of ether-esters useful as plasticizers as disclosed in U.S. Patent No. 2,803,646. A major difficulty encountered in the use of 2-p-dioxanone is its physical properties, and especially its keeping and handling characteristics. Although in its pure state it is a solid melting at about 27° C., it is characterized by a decided tendency toward polymerization on standing. As polymerization proceeds low molecular weight polymers are produced which are soluble in the 2-p-dioxanone monomer causing first a highly viscous substance to be produced which gradually changes to a wax-like material and finally, after several months, to a hard material. In the gradual hardening of the material expansion takes place causing the container in which it is stored to burst or break. Also, during its changes in consistency the material is extremely difficult to handle, sticking both to its container and the tools used for transferring it. Although considerable effort has been directed toward finding a stabilizer for 2-p-dioxanone against polymerization, to date none has been found.

The major complaint concerned with using 2-p-dioxanone stems from its undesirable physical characteristics caused by its tendency to polymerize, for which there does not appear to be an answer. It was, therefore, surprising that what appears to be an inherent disadvantage can in fact be turned into a practical success by converting the material which is otherwise difficult to handle into a shiny, hard, easily processable material by polymerization under controlled conditions. Further, the polymer produced in accordance with the method of the present invention can be used for many of the purposes that the 2-p-dioxanone monomer has. However, if the monomeric 2-p-dioxanone is desirable it can be obtained easily from the polymer produced in accordance with the present invention by distilling the same and recovering the monomer as condensate.

It is, therefore, an object of the present invention to provide a process for the controlled polymerization of 2-p-dioxanone.

It is another object of the present invention to provide a polymerized 2-p-dioxanone product having a melting point in excess of 90° C. and characterized by a hard, shiny appearance and easy handling properties.

It is a further object of the present invention to provide 2-p-dioxanone in a form which is easily handled and which is capable of being regenerated to provide 2-p-dioxanone monomer when desired.

Additional objects of the present invention will be apparent from the description to follow hereinafter.

In accordance with the present invention 2-p-dioxanone monomer, either in its pure form or containing a quantity of its lower polymerization products, is heated at a temperature in the range of about 85 to 110° C. for a period of from about 5 to about 30 minutes in the presence of from about 0.05 to 1.0 weight percent of concentrated sulfuric acid. It will be appreciated that longer times or a higher sulfuric acid concentration can be employed at the lower temperature ranges and vice versa at the higher temperature ranges. The preferred ranges of temperature, time, and concentrated sulfuric acid concentration are 90 to 100° C., 10 to 15 minutes and 0.05 to 0.10 weight percent, respectively. In a preferred specific process p-dioxanone monomer is heated at a temperature of about 95° C. for about 10 minutes in the presence of about 0.05 weight percent of concentrated sulfuric acid.

Although other acid materials such as hydrochloric acid or syrupy phosphoric acid can be used to produce a polymerized 2-p-dioxanone product, disadvantages apparently inherent in the use of these materials make the process of the present invention considerably more desirable. For example, in the use of gaseous HCl as a catalyst, a product is obtained which has a low melting point and which requires recrystallization from a suitable solvent, such as methanol, to produce a material having desirable characteristics. Further, hydrochloric acid has the additional disadvantage of its harmful and corrosive effects on metal equipment. Although syrupy phosphoric acid is capable of producing a hard polymer having a reasonably good color and high melting point, the time required to produce such a material, viz. about one week, is excessive and uneconomical.

As mentioned hereinabove, the poly-2-p-dioxanone produced in accordance with the present invention is capable of being depolymerized to the monomer by distilling the same. In such a process it is desirable to neutralize the sulfuric acid catalyst used in the polymerization process. An important advantage of the present process is the small quantity of sulfuric acid needed to cause polymerization with the concomitantly small quantity of base material needed to neutralize the same when recovering the monomeric material from the polymeric material. Thus, for example, only about 0.1 part of 50% aqueous caustic is required to neutralize the catalyst present in 100 parts of poly-p-dioxanone when 0.05 weight percent of concentrated $H_2SO_4$ is used and only a very small amount of inorganic salt will be present in the distillation vessel.

The following examples are intended as illustrative of the underlying principles of the present invention and are not to be construed as unduly limiting thereof.

EXAMPLE 1

The 2-p-dioxanone used in this example was prepared by passing vaporized diethylene glycol through a bed of a copper chromite catalyst held at a temperature of about 300° C. for a period of about 6 hours at the rate of about 1.1 parts by weight of diethylene glycol per part of catalyst per hour. The material thus produced was purified by fractional distillation. The low boiling materials were first separated and the p-dioxanone recovered from a series of cuts taken at temperatures ranging between 93 to 97° C. at 10 mm. Hg pressure. The polymer subsequently formed with sulfuric acid was a beige color in nearly every instance. It was noted that the material which formed a dark polymer generally came from the final cuts of 2-p-dioxanone on the distillation column.

A series of runs was made employing concentrated sulfuric acid as a catalyst wherein the 2-p-dioxanone material containing varied weight percentages of catalyst was heated for various periods of time at different temperatures. The results obtained are presented in Table 1.

*Table 1*

| Run No. | Wt. Percent Catalyst | T. (°C.) | Time (min.) | Color[1] | Appearance | M.P. (°C.) |
|---|---|---|---|---|---|---|
| 1 | 0 | 150 | 300 | white | soft, mushy | |
| 2 | 0.2 | 100 | 10 | lt. tan | hard, shiny | 93-5 |
| 3 | 0.1 | 100 | 10 | white | do | 92-4 |
| 4 | 0.1 | 100 | 20 | lt. tan | do | 92-4 |
| 5 | 0.1 | 100 | 30 | do | do | 93-5 |
| 6 | 0.1 | 100 | 10 | lt. brn | do | 89-92 |
| 7 | 0.1 | 100 | 10 | white | do | 93-9 |
| 8 | 0.1 | 100 | 10 | lt. tan | do | 90-2 |
| 9 | 0.1 | 100 | 10 | lt. yel | do | 92-5 |
| 10 | 0.1 | 100 | 10 | lt. tan | do | 93-5 |
| 11 | 0.05 | 100 | 10 | white | do | 94-6 |
| 12 | 0.05 | 100 | 20 | do | do | 94-6 |
| 13 | 0.025 | 90 | 10 | do | sticky, grainy | 85-90 |
| 14 | 0.025 | 90 | 20 | do | do | 86-92 |
| 15 | 0.025 | 100 | 30 | do | do | 93-96 |
| 16 | 0.025 | 100 | 40 | do | do | 93-96 |

[1] Color of product at room temperature.

In a comparison test 0.15 weight percent of concentrated syrupy phosphoric acid was added to 2-p-dioxanone monomer and heated for 60 minutes at 100° C. The resulting product was a white, mushy material which hardened and swelled on standing after one week and which had a melting point of about 98° C.

EXAMPLE 2

In this example two runs were made using 2-p-dioxanone prepared in the manner described in Example 1. In both runs a sigma-blade dough mixer was employed in order to establish the feasibility of large-scale polymerization of 2-p-dioxanone. Further, in both runs 0.05 weight percent of sulfuric acid was employed and the material was heated at 90° C. for 10 minutes.

In the first run 1900 parts by weight of 2-p-dioxanone were used and the blades of the mixer dipped in and out of the liquid during the heating step which caused a small amount of splashing. The product produced from this run was light tan in color and ranged in size from lumps of about ½ inch to a dusty powder. The product had a melting point in the range of from 92–97° C.

In the second run 6900 parts by weight of 2-p-dioxanone were employed which was sufficient to cover the blades of the mixer completely. The same conditions of catalyst concentration, time and temperature were used as in the first run. The material produced from this run was ground in a Wiley mill to hard granules. The product was free-flowing and in a convenient form for utilization or storage. The melting range was from 95–97° C. and the neutral equivalent was 103.6 (theoretical 102). In both runs an apparent high heat of crystallization was observed and the solid polymer cooled rather slowly.

A quantity of the poly-2-p-dioxanone produced was subjected to simple atmospheric distillation, after the addition of 0.1 weight percent caustic, to give a 92% recovery of product of higher quality than the original starting material. Reaction of this material with ethylene diamine proceeded smoothly to give the diamide of the same quality as obtained from the p-dioxanone itself. The polymer had a solubility of less than 1% in boiling water, ethanol, acetone, benzene and ethyl acetate. It dissolved readily in methoxyethanol at 70° or over and crystallized as a fine white powder on cooling.

While this invention has been described and exemplified in terms of its preferred embodiment those skilled in the art will appreciate that modifications can be made without departing from the spirit and scope of this invention.

What is claimed is:

1. A process for the polymerization of 2-p-dioxanone which comprises heating 2-p-dioxanone at a temperature in the range of from about 85° C. to about 110° C. for a period of from about 5 to 30 minutes in the presence of from about 0.05 to about 1.0 weight percent of concentrated sulfuric acid.

2. A process for the polymerization of 2-p-dioxanone which comprises heating 2-p-dioxanone at a temperature in the range of from about 90° C. to about 100° C. for a period of from about 10 to 15 minutes in the presence of from about 0.05 to about 0.10 weight percent of concentrated sulfuric acid.

3. A process for the polymerization of 2-p-dioxanone which comprises heating 2-p-dioxanone at a temperature of about 95° C. for a period of about 10 minutes in the presence of about 0.05 weight percent of concentrated sulfuric acid.

4. Polymerized 2-p-dioxanone having a melting point of from about 90° C. to about 100° C. having a hard, shiny appearance produced in accordance with the process of claim 1.

References Cited in the file of this patent

Carothers et al.: J. Am. Chem. Soc.," vol. 54, pp. 761–72, (1932).

Leimu et al.: "Suome Kemistilehti," 16B, pp. 4–8 (1943).